United States Patent [19]

Askins

[11] 4,416,081
[45] Nov. 22, 1983

[54] JAW CONFIGURATION FOR ANIMAL TRAP
[75] Inventor: William E. Askins, Lititz, Pa.
[73] Assignee: Woodstream Corporation, Lititz, Pa.
[21] Appl. No.: 351,591
[22] Filed: Feb. 23, 1982
[51] Int. Cl.³ .......................................... A01M 23/26
[52] U.S. Cl. .......................................... 43/90
[58] Field of Search ............................ 43/90, 88, 91

[56] References Cited
U.S. PATENT DOCUMENTS

| | | | |
|---|---|---|---|
| 2,947,107 | 8/1960 | Lehn | 43/90 |
| 3,010,245 | 11/1961 | Conibear | 43/90 |
| 3,760,531 | 9/1973 | Conibear | 43/90 |
| 3,762,094 | 10/1973 | Conibear | 43/92 |
| 3,816,955 | 6/1974 | Conibear | 43/90 |
| 3,971,155 | 7/1976 | Conibear | 43/90 |
| 4,117,623 | 10/1978 | Conibear | 43/90 |
| 4,128,961 | 12/1978 | Conibear | 43/90 |
| 4,250,654 | 2/1981 | Souza | 43/90 |

*Primary Examiner*—Gene Crosby
*Attorney, Agent, or Firm*—Holman & Stern

[57] ABSTRACT

An improved rotating frame animal trap includes jaw-forming sides which, in the closed position of the trap, are projected toward one another from parallel sections of their supporting end members. This configuration provides the correct jaw spacing in the closed position of the trap to maximize the jaw pressure for a given spring force.

11 Claims, 4 Drawing Figures

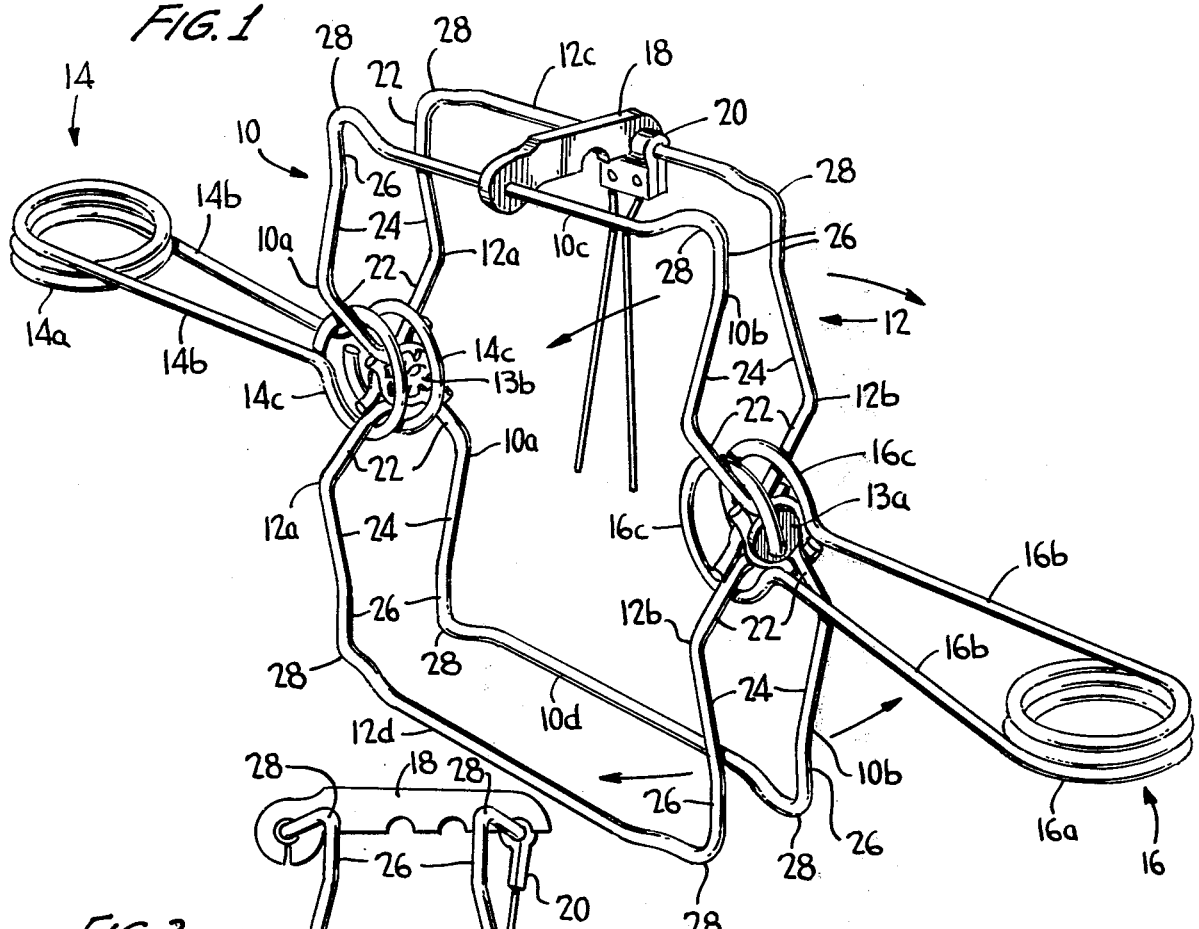
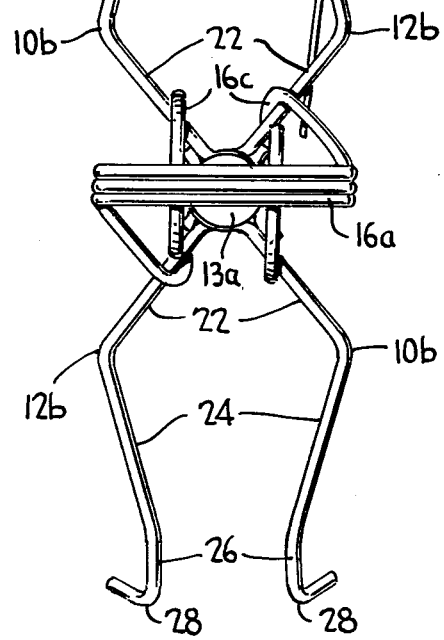
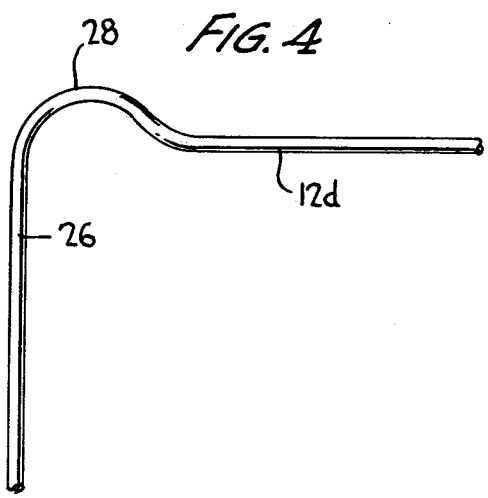

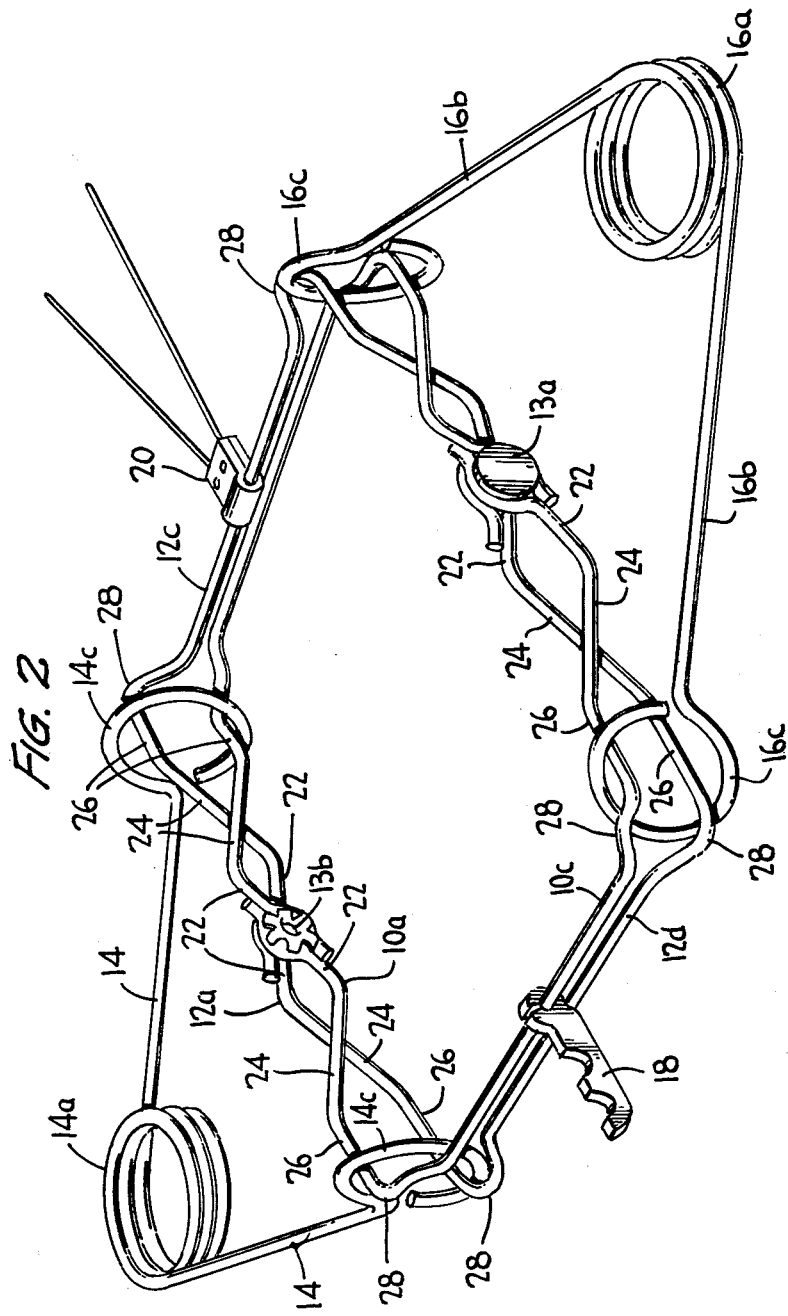

JAW CONFIGURATION FOR ANIMAL TRAP

TECHNICAL FIELD

The present invention relates to rotating frame animal traps of the type comprising a pair of frames which are pivotally connected at adjacent ends for rotation about a common axis and forming at their sides two (2) pairs of co-acting jaws. More specifically, the present invention relates to an improvement in the jaw structure for such animal traps.

BACKGROUND OF THE INVENTION

Rotating frame animal traps of the type described herein generally have frames of square or rectangular shape as described in U.S. Pat. No. 3,010,245; alternatively, the frames may be partially trapezoidal as described in U.S. Pat. No. 3,760,531. The trap includes at least one actuator, comprising a coil spring having arms terminating in rings which are slidable along and encircle one set of adjacent ends of the frames. The actuator is used to urge the jaws toward a closed position and maintain them in that position. In the aforesaid U.S. Pat. No. 3,010,245, such a rotating frame trap is described wherein the ends which cooperate with the rings are shaped so that in the set position of the trap, outer portions of these ends on each side of central portions lie substantially parallel to one another, while the central portions of these ends near the common axis of the frames form a cross with each other within the rings on the arms of the coil spring. In this version of the trap, the jaw-forming sides of each of the frames lie in a common plane and the outer portions of the ends extend directly to the jaws. A trigger and release mechanism (for example, as described in U.S. Pat. Nos. 2,947,107; 3,762,094; and 3,816,955) maintains the frames in an open position when the trap is set. When the trap is sprung, such mechanism releases the frames so as to permit rapid rotation of the frames through the action of the actuator rings, through an angle of about 90° so that the jaws quickly strike and squeeze an animal in the trap.

This type of trap is widely used because it is based on humane principles. It has been favored by numerous humane trapping groups because it constitutes a substantial improvement over such traps as the leg-hold trap. However, despite the present wide usage of rotating frame traps and their humane effectiveness, there is a constant demand from humane trapping groups to improve the humane efficiency of the trap, i.e. to make the trap more effective so that it kills any desired animal passing through it as quickly as possible. Unless an animal caught in such a trap is killed instantly by the impact of the jaws on its body, the trap may then act as a body-holding trap and consequently death may be extremely slow and painful. It can thus be readily appreciated that if improvements can be made whereby the trap clamping force can be increased, the humane effectiveness of the trap will be improved.

Prior art attempts to increase the clamping force of rotating frame animal traps may be found in U.S. Pat. Nos. 4,117,623 and 4,250,654. In U.S. Pat. No. 4,117,623, the jaw, in the closed trap position, projects out of plane from the frame end members and toward the jaw of the opposing frame member. The juncture between the end members and the projecting jaw-forming side is configured so that the actuator ring encircles and bears against the adjacent frame ends in the closed trap position, thereby permitting a quicker and more humane death for the animal. In U.S. Pat. No. 4,250,654, the frame end members are formed in subsections with particular angular relationships intended to maximize the clamping force between the jaws. While both of these devices are effective for their intended purpose, neither one provides the correct jaw spacing in the closure position combined with maximum utilization of spring force for a given actuator.

The force which a trap develops at a given point in the travel of the actuator rings along the frame ends is dependent upon a number of factors, such as the power of the actuator spring, the diameter and shape of the actuator ring, the distance of the rings from the frame pivot point, and the frame design and geometry. The present invention makes use of a given actuator to maximize its closure force while providing the correct jaw spacing in the closed trap position to more readily kill the trapped animal on closure impact.

SUMMARY OF THE INVENTION

It is therefore an object of the present invention to provide an improved rotating frame animal trap in which the frames are configured to provide the correct jaw spacing upon closure while maximizing the spring force available in a given actuator.

In accordance with the present invention, the frames of a rotating frame animal trap include end members having three (3) angularly related sections extending between the central pivot point and the connection to the jaw-forming side. An inner section extends radially from the pivot point and joins an intermediate section at a specified angle. The intermediate section, in turn, extends to a remote section which, in the closed trap position, is oriented parallel to a similar remote section of the opposite frame. The jaw-forming side extending between two (2) remote sections of a frame is bent slightly out of plane from the remote sections so as to project slightly toward the corresponding jaw-forming side of the opposed jaw in the closed position. The two (2) opposed jaw-forming sides in the closed position, are spaced by a distance which depends upon the size of the trap, the nature of the animal to be caught, etc. In the preferred embodiment, the angular relationship between the remote section and intermediate section of each end member is on the order of 165°–175° while the angular relationship between the inner section and the intermediate section is on the order of 125°–135°. The resulting structure provides the correct spacing between the jaw-forming sides of the frame in the closed trap position while maximizing the available force in the actuator spring to effect instantaneous killing of the animal caught between the trap jaws.

BRIEF DESCRIPTION OF THE DRAWINGS

The above and still further objects, features, and advantages of the present invention will become apparent upon consideration of the following detailed description of one embodiment thereof, especially when taken in conjunction with the accompanying drawings, wherein:

FIG. 1 is a view in perspective view of a trap according to the present invention shown in its set position;

FIG. 2 is a view in perspective of the trap of FIG. 1 shown in its closed position;

FIG. 3 is a side elevation view illustrating the configuration of the frames of the trap of FIG. 1 in the set position; and FIG. 4 is a partial view in plan of a portion of one of the frames of FIG. 3.

DESCRIPTION OF THE PREFERRED EMBODIMENTS

Referring specifically to FIGS. 1 and 2 of the accompanying drawings, the rotating frame animal trap of the present invention includes a pair of generally rectangular frames 10,12 of like configuration. Frame 10 has end members 10a and 10b extending between the ends of respective jaw-forming sides 10c and 10d. Similarly, frame 12 has end members 12a and 12b extending between opposite ends of jaw-forming 12c and 12d. As illustrated, adjacent ends of the respective frames are provided with pivotal interconnections 13a,13b at their midpoints for mutual rotation of the frames about a common axis extending substantially perpendicular to the frame ends.

The trap is provided, at its opposite ends, with conventional actuators 14,16, respectively, each actuator comprising a coil spring 14a,16a and pairs of arms 14b,16b urged apart by the spring. The arms 14b,16b terminate in actuator rings 14c,16c which encircle the adjacent ends of the trap frame as shown on opposite sides of the pivot connections 13a,13b. A dog-type catch 18 is pivotally mounted on jaw-forming side 10c of frame 10 for engagement with jaw-forming side 12c of frame 12 to hold the trap in its set position illustrated in FIG. 1. Jaw-forming side 12c carries a conventional pivotally mounted trigger 20 for releasing the catch 18 when the trigger is moved by an animal so as to spring the trap.

In order to set the trap, actuator arms 14b,16b are pressed together against the action of their respective springs and the frames are mutually rotated to bring jaw-forming side 10c into proximity with jaw-forming side 12c. Depending upon the size of the trap and the strength of actuators 14,16, a setting tool may be employed, as is conventional. When jaw-forming sides 10c and 12c are sufficiently proximate one another, catch 18 is engaged and holds these jaw-forming sides against relative movement. In this position, the ends of the respective frames themselves hold the actuator rings together against the action of their respective springs.

When catch 18 is released by movement of trigger 20, the frames are free to rotate and springs 14a,16a cause the actuator rings to rapidly spread apart and thereby force the respective trap jaws together. In this respect, jaw-forming sides 10c and 12d define one trap jaw and jaw-forming sides 12c and 10d define the other trap jaw.

If the space between the jaws is unobstructed, the trap, when sprung, assumes substantially the position shown in FIG. 2. In use, however, a target animal's body will be present between the jaws so that the jaws will not be able to close completely. As indicated, traps are generally designed to catch a particular size range of target animal. Impact with the animal will accordingly occur when the trap jaws are at a certain predetermined distance apart (referred to as the "target opening") and the jaws will then close further to a degree dependent upon the jaw force and the compressability of the animal.

The trap as described thus far is a conventional rotating frame animal trap. The present invention relies in the specific configuration of the end members 10a, 10b, 12a, 12b and the orientation of the jaw-forming sides 10c, 10d, 12c, 12d relative to the end members. In accordance with the present invention, the end members and the jaw-forming sides are configured to provide the correct jaw spacing upon closure and to achieve the maximum closure force for a given set of actuators 14, 16. The novel frame configuration can be seen from each of the drawing FIGS. 1, 2, 3 and 4, it being noted that the trap is shown set in FIGS. 1 and 3 and closed in FIG. 2. Also, frame 10 is substantially identical to frame 12 and end members 10a, 10b, 12a and 12b are substantially identical to one another. Initially, considering end member 10b, two (2) identical halves of each end member extend in diametrically opposed directions from pivot connection 13a. Specifically, each half of end member 10b includes an inner section 22 which extends substantially radially from pivot connection 13a. The distal end of inner section 22 terminates in a bend junction with an intermediate section 24 which subtends an angle with inner section 22 which is on the order of 125°–135° in the preferred embodiment. The distal end of intermediate section 24 terminates in a bend junction with a remote section 26 which subtends an angle with intermediate section 26 on the order of 165°–170°. The angle between sections 24 and 26 is in an opposite sense to the angle between sections 22 and 24 so that each half of the member 10b has a zig-zag like configuration.

Bent sections 22, 24 and 26 are similarly provided in each half of frame end members 10a, 12a and 12b, and the same reference numerals are used to designate these sections for all frame end members.

In the set trap position, illustrated in FIGS. 1 and 3, jaw-forming sides 10c and 12c are held in fixed spaced relationship by catch 18 in a conventional manner. A similar spacing is thereby maintained between sides 10d and 12d. Importantly, jaw-forming sides 10c and 12c are bent out of plane with respect to their supporting remote sections 26 so as to extend generally away from one another. Sides 10d and 12d are likewise bent to extend from one another in the open or set trap condition.

In the closed trap position, as best illustrated in FIG. 2, the out-of-plane bends in jaw-forming sides 10c and 12d orient these sections to extend toward one another so as to be spaced closer toward one another than sections 26 of end members 10b and 12b. More specifically, as best illustrated in FIG. 4, the outer extremity of the remote section 26 extends beyond the jaw-forming side 12b (or 10c) to form a loop 28 which joins the end of section 26 with the end of the jaw-forming side. Loop 28 is bent slightly to project the jaw-forming side 12b (or 10c) toward jaw-forming side 10c (or 12b). The extent of the bend formed by loop section 28 and the resulting spacing between jaw-forming sides 10c and 12b in the closed trap position depend upon the size of the trap and the particular application (that is, the nature of the animal to be trapped, etc.). A similar relationship exists between facing jaw-forming sides 10d and 12c in the closed trap position.

Loop section 28 permits the actuator rings 14c, 16c to travel a maximum possible distance upon closure of the trap and thereby operate with a maximum amount of leverage at the small jaw openings. In addition, loop section 28 prevents the actuator rings from extending past the section 26 and onto the jaw-forming sides. In these respects, loop section 28 is conventional. However, by being bent so as to extend the jaw-forming sides toward one another in the closed position, loop 28 differs from the loop sections conventionally employed in rotating frame animal traps.

It is noted that, in the closed trap position, the remote sections 26 at either end of jaw-forming side 10c are substantially parallel to and spaced from corresponding sections 26 at either end of jaw-forming side 12d. Likewise, the remote sections 26 at either end of jaw-forming side 10d are substantially parallel to and spaced from corresponding sections 26 at either end of jaw-forming side 12c. More specifically, an imaginary plane may be considered as extending between sides 10c and 12b and between sides 10d and 12c. Such an imaginary plane is substantially parallel to all eight (8) sections 26 when the trap is closed. Such plane subtends an angle on the order of 30°-45° with each of the sections 22 in the closed trap position so that the two (2) zig-zag bends of 125°-135° and 165°-170° leaves sections 26 substantially parallel to the imaginary plane. In other words, the bend between sections 22 and 24 of 125°-135° is back toward the imaginary plane, leaving sections 24 converging toward the plane at an angle of between 165° and 170°. The bend of 165°-170° between sections 24 and 26 is away from the imaginary plane, leaving section 26 substantially parallel to that plane.

It has been found that by providing the frame ends and jaw-forming sides with the characteristics set forth above, the correct jaw spacing upon closure can be more accurately achieved while obtaining the optimum closure force from a given set of actuator springs.

While one specific embodiment of the invention has been illustrated and described, it will be clear that variations of the details of construction which are specifically illustrated and described may be resorted to without departing from the true spirit and scope of the invention as defined in the appended claims.

I claim:

1. In an animal trap of the type comprising two frames, each frame having a jaw-forming side and first and second end members extending from said jaw-forming sides, pivot means connecting the first end member of one frame to the second end member of the other of said frames, and connecting the second end member of said one frame to the first end member of the other frame for pivotal movement of said frames about a common axis between a set position, in which said jaw-forming side of said one frame is positioned remote from the jaw-forming side of the other frame, and a closed position in which said jaw-forming sides of said one and said other frames are positioned closely adjacent one another in opposite sides of an imaginary plane containing said common axis and residing between said jaw-forming sides in said closed position of said frames, actuator means for forcefully biasing said frames to rotate toward said closed position and trigger means for releasably maintaining said frames in said set position in opposition to said actuator means, the improvement wherein said first and second end members of at least said one frame are configured to include an inner section extending generally radially outward from said common axis at an acute angle relative to said imaginary plane, a remote section extending generally inward from the jaw-forming side of said one frame and in parallel spaced relation to said imaginary plane when said frame members are in said closed position, and an intermediate section extending between the inner and remote sections.

2. The trap according to claim 1, wherein said jaw-forming side of said one frame member includes an elongated mid-portion which, in said closed position of said frame members, extends parallel to said imaginary plane at a distance therefrom which is less than the spacing between the imaginary plane and said remote sections.

3. The trap according to claims 1 or 2, wherein said remote section and said intermediate section join at an angle of approximately 165°.

4. The trap according to claim 3, wherein said inner section and said intermediate section join at an angle approximately 135°.

5. The trap according to claim 4, wherein said inner section subtends an angle of approximately 30° relative to said remote section.

6. The trap according to claims 1 or 2, wherein said inner section and said intermediate section join at an angle of approximately 135°.

7. In an animal trap of the type having two similar frames, each frame having first and second jaw-forming sides and first and second end members extending from said jaw-forming sides, pivot means connecting the first end member of one of said frames to the second end member of the other of said frames and connecting the second end member of said one of said frames to the first end member of the other of said frames for pivotal movement of said frames about a common axis extending between a substantial longitudinal center of said first and second end members of said two frames, said frames being pivotable about said common axis between a set position, in which said first jaw-forming sides of said two frames are relatively remote from one another and said second jaw-forming sides of said frames are relatively remote from one another, to a closed position, in which said first jaw-forming sides are closely adjacent to one another and said second jaw-forming sides are closely adjacent to one another, actuator means for forcefully biasing said frames to rotate toward said closed position, and trigger means for releasably maintaing said frames in said set position in opposition to said actuator means, the improvement wherein the end members of said frames each include two similar halves on opposite sides of said pivot means, each half including:

a remote section which joins with a respective jaw-forming side and which, in the closed position of said frames, extends parallel to and closely spaced from a facing similar remote section of the other frame;

an inner section extending generally radially outward from said common axis and subtending an acute angle with respect to said remote sections; and an intermediate section extending between said remote and inner sections.

8. The trap according to claim 7, wherein, in said closed position of said frames, said first jaw-forming sides extend substantially parallel to one another and are more closely spaced than the facing remote sections joined thereto, and said second jaw-forming sides extending substantially parallel to one another and are more closely spaced than the facing remote sections joined thereto.

9. The trap according to claims 7 or 8, wherein said remote section and said intermediate section are joined at an angle of approximately 165°.

10. The trap according to claim 9, wherein said inner section and said intermediate section join at an angle of approximately 135°.

11. In an animal trap of the type having two similar frames, each frame having first and second jaw-forming sides and first and second end members extending from said jaw-forming sides, pivot means connecting a first end member of one of said frames to the second end member of the other of said frames and connecting the second end member of said one of said frames to the first end member of the other of said frames for pivotable movement of said frames about a common axis extending between the substantial longitudinal center of said first and second end members of said two frames, said frames being pivotable about said common axis between a set position, in which said first jaw-forming sides of said two frames are relatively remote from one another and said second jaw-forming sides of said two frames are relatively remote from one another, to a closed position in which said first jaw-forming sides are closely adjacent one another said said second jaw-forming sides are closely adjacent one another, actuator means for forcefully biasing said frames to rotate toward said closed position, and trigger means for releasably maintaining said frames in said set position in opposition to said actuator means, the improvement wherein the portions of said end members remote from said common axis extend, in the closed position of said frames, parallel to one another, and wherein the jaw-forming sides of the frames, in the closed position of the frames, project toward one another to provide a jaw closure spacing which is smaller than the spacing between said remote parallel portions of said end members.

* * * * *